1700X
E. Clark.
Scow.
Patented Apr. 2, 1812.
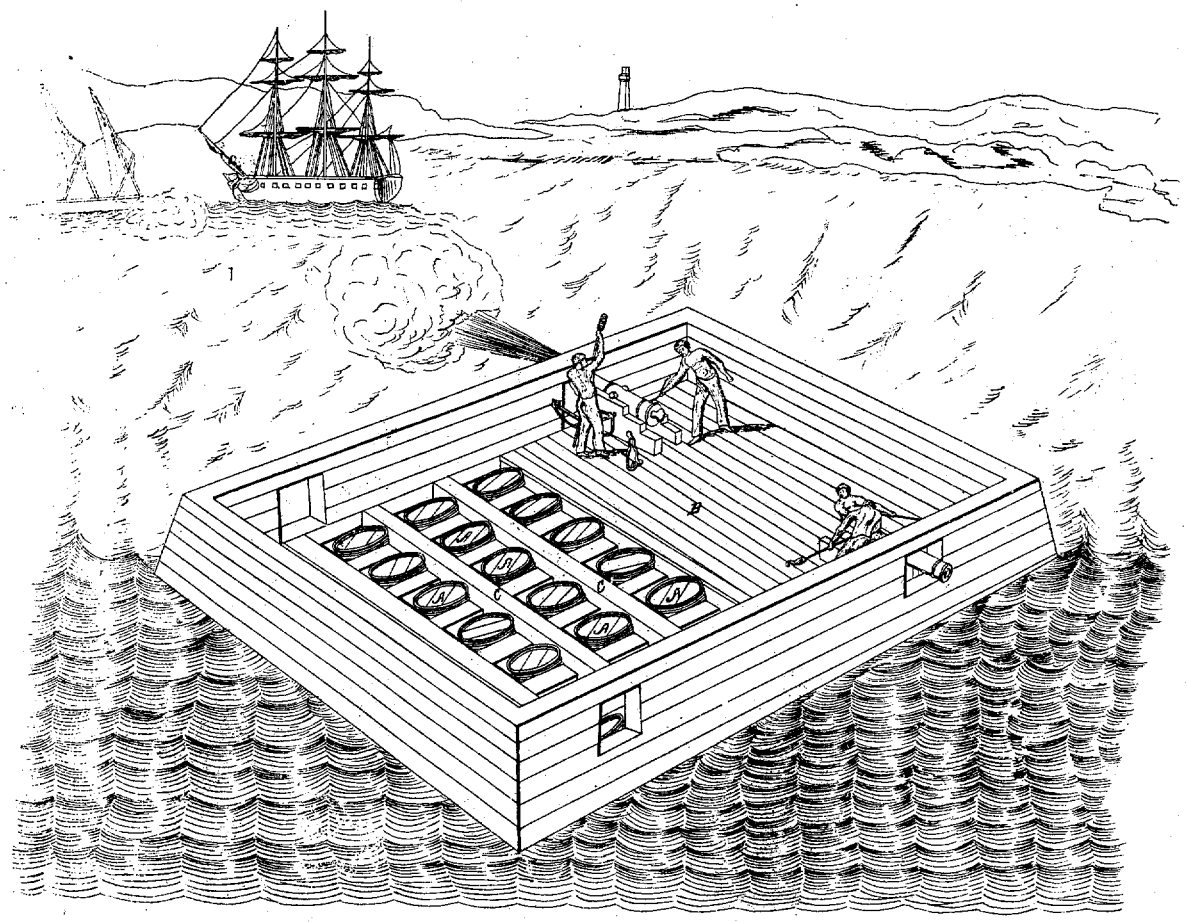
N. PETERS, PHOTO-LITHOGRAPHER, WASHINGTON, D. C.

[illegible] 2. 1812

Edward Clark a citizen of the United States

Letters Patent.

The schedule referred to in these Letters Patent and making
part of the same containing a description in the words of the
said Edward Clark himself of his Buoy Forts.

Make a raft of timber of any dimensions suitable to the object
in view, erect upon it sides and ends of a thickness sufficient
if required to resist a cannon ball, and raised above the base
five feet more or less. The timber is supposed to be placed at para-
llel distances in the base and locked together, firmly by cross pieces
so that the float resembles a chest without a lid. with a bottom
of ribbed timbers and cross pieces tied with sides and ends of a
firm and close texture. Within this float place empty casks or
vessels, as rum puncheons &c. either with or without a false
bottom, rising & falling with the increase or decrease of the
space occupied by the casks, or empty vessels. Then cover the chest
or float with a firm deck effectually secured by connection
with the bottom, so as to answer the purpose of erecting any
means of defence. The casks may consist of puncheons, pipes
or other empty vessels, such as may appear most proper for the
particular object in view. It is to be observed that the Machine
may be varied in shape from the chest to resemble a boat,
ship &c. at pleasure, and this application of the principle
of buoying burthens, by empty vessels in these measurements may
be extended as well to sustain warehouses, Mills, to convey
burthens in shallow water and along rivers, and to various
other purposes, as to sustain Forts. On the top of the float may
be erected a fort of any reasonable dimensions required,
and the buoyant principle is such, that it is confidently as-
serted that it may be made to support all the means of defense for Lieutenant Colonel. [illegible] are intended to float from place to place, and at pleasure to be moved in [illegible] beds and [illegible] to repel attack by water, and to fall back [illegible] Ships.

Witnesses

James Hooker

Joseph D. Fay

Ottawa Clark.

Ent.

MGL.

[illegible] 1.9